(No Model.)  J. A. GRAHAM.  3 Sheets—Sheet 1.
LATHE CHUCK.
No. 599,961.  Patented Mar. 1, 1898.
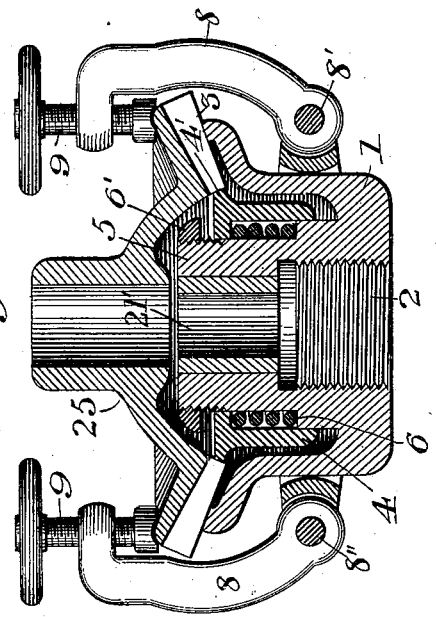
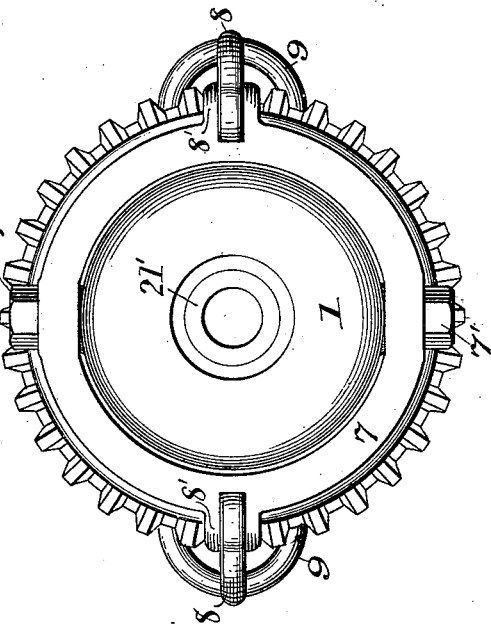
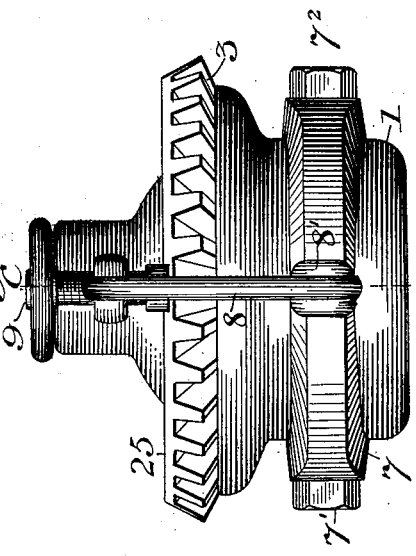
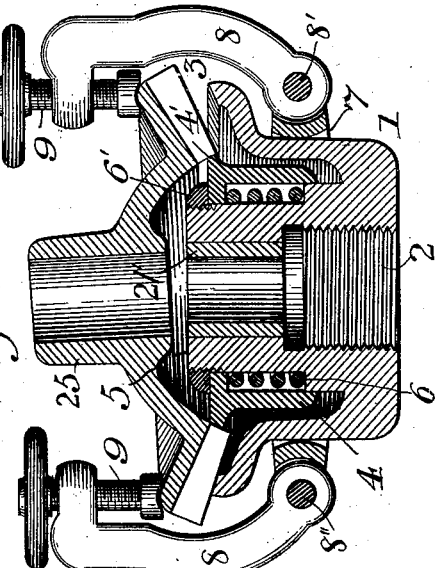
Witnesses:
Inventor.
James A Graham
By his Attorney
E. W. Burgess (No Model.)  3 Sheets—Sheet 2.

J. A. GRAHAM.
LATHE CHUCK.

No. 599,961.  Patented Mar. 1, 1898.

Witnesses:
H. Slater
W. Zachow

Inventor:
James A. Graham
By his Attorney
E. W. Burgess (No Model.)

J. A. GRAHAM.
LATHE CHUCK.

No. 599,961.

Patented Mar. 1, 1898.

3 Sheets—Sheet 3.

Witnesses:
H. Flater
W. Zachow

Inventor:
James A. Graham
By his Attorney E. W. Burgess

UNITED STATES PATENT OFFICE.

JAMES A. GRAHAM, OF MILWAUKEE, WISCONSIN.

LATHE-CHUCK.

SPECIFICATION forming part of Letters Patent No. 599,961, dated March 1, 1898.

Application filed May 24, 1897. Serial No. 637,916. (No model.)

*To all whom it may concern:*

Be it known that I, JAMES A. GRAHAM, a citizen of the United States, residing at Milwaukee, in the county of Milwaukee and State of Wisconsin, have invented a new and useful Lathe-Chuck or Work-Holding Device, of which the following is a specification.

My invention relates to improvements in lathe-chucks or work-holding devices in which the part to be operated upon is secured in order that it may be bored or faced, such as bevel-wheels, spur-wheels, or other like articles, where the operation consists of boring and facing, or either; and the object of my invention is to provide an automatic centering device that will allow the part to be operated upon to be secured in position, and also a means for securing said part to the work-holding device that will equalize the pressure upon each clamping-point and hold the work in such a manner that its working face will revolve concentrically with and in a plane perpendicular to the axial line and avoid any inaccuracy of results if the part to be operated upon should present an uneven surface for the clamping device to act upon.

I attain these objects by the mechanism illustrated in the accompanying drawings, in which—

Figure 6:
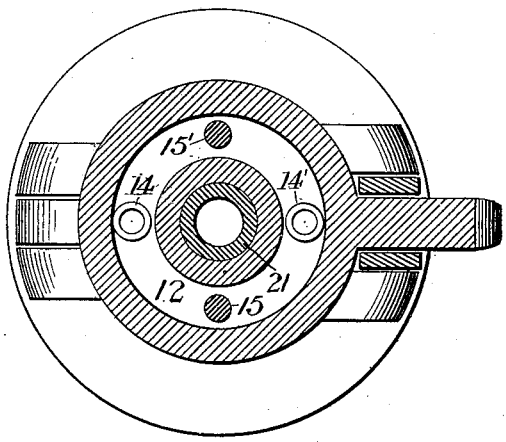
Figure 7:
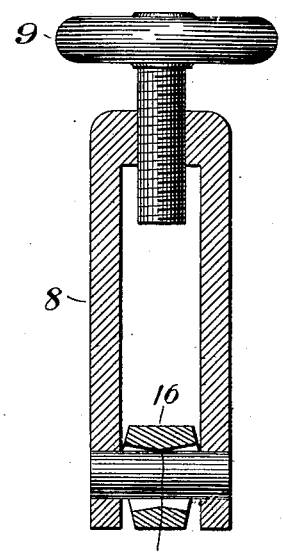
Figure 5:
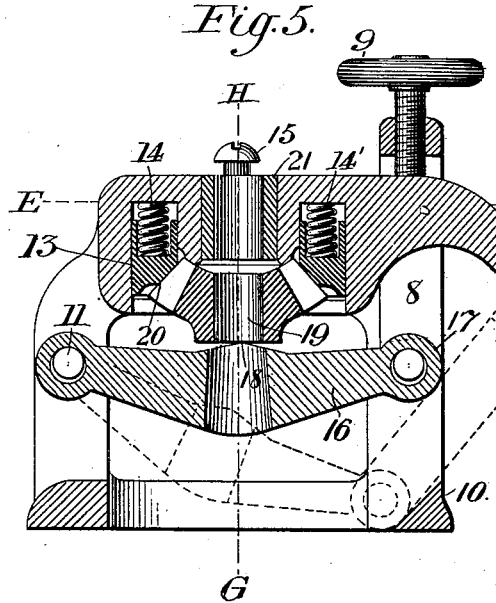
Figure 8:
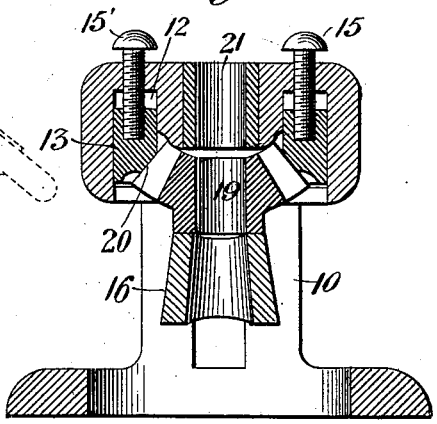
Figure 10:
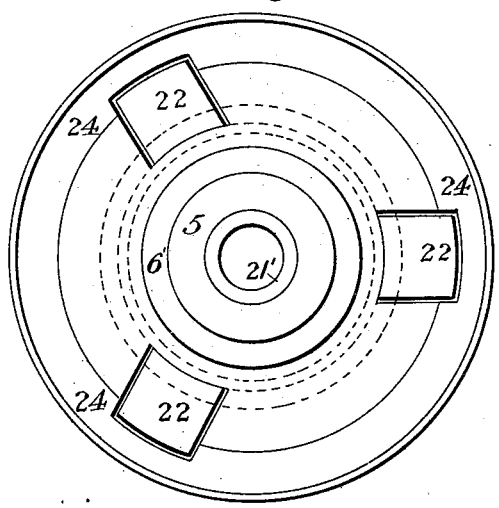
Figure 9:
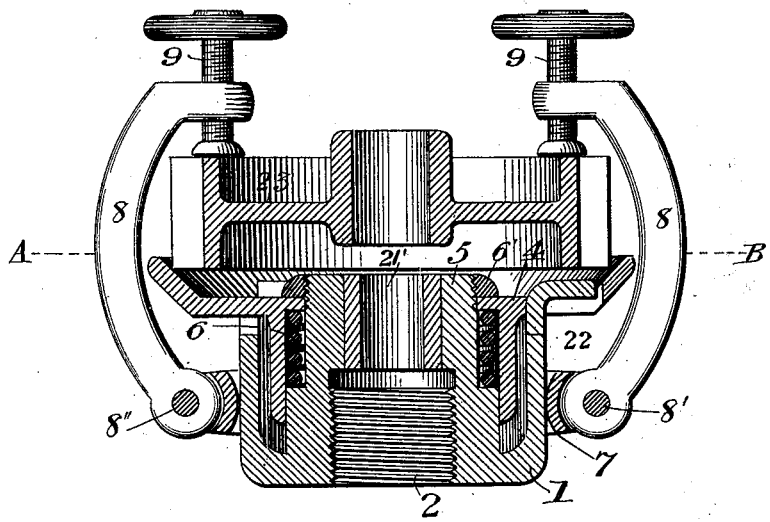

Figure 1 is an elevation of a lathe-chuck, with the part to be operated upon secured in position. Fig. 2 is a cross-section on line C D of Fig. 1. Fig. 3 is a bottom view of Fig. 1. Fig. 4 is a sectional elevation of Fig. 1, showing the action of the centering and clamping mechanism. Fig. 5 is a sectional elevation of a modified form of my improvement. Fig. 6 is a section on line E F, Fig. 5. Fig. 7 is an enlarged section of swinging clamping-link 8' of Fig. 5, shown partly in section in clamping position and by dotted lines in releasing position. Fig. 8 is a vertical section of Fig. 5 on line G H. Fig. 9 is another modification of my invention. Fig. 10 is a top view of Fig. 9 on line A B.

Similar numerals refer to similar parts throughout the several views.

In Figs. 1, 2, 3, and 4, 1 is the body of the chuck, screw-threaded at 2 to adapt it to be attached to the lathe-spindle. The body 1 is provided at its outer surface with an inclined portion 3, adapted to form a seat upon which the part to be operated upon is secured. In practice I deem it best to have this seat so arranged with relation to the part to be operated upon that it will bear against a portion of the working face of said part at a point least liable to present an untrue surface, as shown at Figs. 2, 5, and 8.

4 is a shell portion, fitted to slide upon the hub 5 of the body portion 1 and provided at its outer end with a flange 4', extending outward and adapted to fit against the inner ends of the teeth upon the bevel-wheel shown for the purpose of illustration. It is also provided with an internal flange which rests upon the coiled spring 6, and a collar 6' is screwed upon the hub 5 to retain it in place.

7 is a gimbal-ring, pivoted to the body portion 1 at 7' and 7² and provided with diametrically-arranged slots perpendicular to the axial line of said pivots, in which are pivoted the swinging clamping-links 8. These links are provided at their upper ends with screw-threaded portions, through which operate the binding-screws 9.

In Figs. 5 and 8, 10 is a body portion adapted to be clamped to the face-plate of a lathe or to the work-table of a drill-press. In the upper portion of 10 is an internal annular recess 12, in which is fitted the ring 13.

16 is a rocking swinging clamping-bar pivoted to the body 10 and 11 and provided at its opposite end with the pivot-bearing 17 for the clamping-link 8. The bar 16 is free to rock upon the pivots 11 and 17, as shown in enlarged section, Fig. 7, and is provided at its center with the angular ridge 18, upon which rests the hub of pinion 19, the part to be operated upon and shown for the purpose of illustration. The ring 13 is beveled upon its internal face 20, corresponding with the angle of teeth upon part 19, and the hub upon the internal portion of body portion 10 is made to conform to the angle of the inner ends of teeth upon said part and forms a seat for the part to be operated upon and upon which it is clamped by the swinging rocking bar 16.

14 and 14' are coiled springs seated in the ring 13 and bearing against the bottom of the annular recess 12.

15 and 15' are screws passing freely through the part 10 and screwed into the ring 13. Their function is to prevent the centering ring or shell from falling too far upon the removal of part 19.

21 and 21' are removable steel bushings.

In Figs. 9 and 10 the body portion 1 is formed on its upper end with three L-shaped projections 22, and the sliding shell 4 is formed at its upper portion with a funnel-shaped rim, designed to center the part 23 to be operated upon and shown for the purpose of illustration, and it is provided with openings 24 to pass over the L-shaped projections 22 on the body portion 1.

The operation of my invention is as follows: The part to be operated upon is placed in position upon the centering-shell 4 and the swinging links are brought into position shown in Fig. 4 and one or more of the binding-screws are adjusted. The shell portion 4, resting upon the coiled spring 6, yields downwardly and allows the part 25 to be firmly secured to the funnel-shaped seat 3, as shown in Fig. 2. The gimbal-ring 7 being free to vibrate upon its pivots and the swinging links 8 turning upon pivots 8' and $8^2$ at right angles to the axial line of the pivots 7', the strain of the binding-screws is equalized and the pressure upon the part to be operated upon is central, and said part will be secured to the chuck with its working face concentric with and perpendicular to the axial line of the chuck, and any inequalities of its reverse side will not affect the result.

In Fig. 9 the part to be operated upon is shown as a spur-pinion and is centered by being placed in the funnel-shaped receiver of the shell portion 4, and the working face of said part is clamped upon the L-shaped seats 22 of the body portion 1, the result being the same as that shown in Figs. 2 and 4.

In Fig. 5 the clamping-bar 16 being provided with a raised portion 18 and having bearings at 11 and 17, as shown at 17 in Fig. 7, the pressure upon the part to be operated upon is central, and said part being secured with its working face resting upon the seat formed upon the internal hub of part 10 any irregularity of the surface resting upon the angular portion on bar 16 will not affect the result, and the function performed is the same as that of the gimbal-ring and clamping device shown in Figs. 2, 4, and 9.

What I claim as my invention, and desire to secure by Letters Patent, is—

1. In a work-holding device, the combination of a body portion, adapted to form a seat for the part to be operated upon, a yielding centering ring or shell, adapted to slide upon the said body portion, a gimbal-ring pivoted to said body portion, with clamping-links pivoted to the said gimbal-ring, substantially as described.

2. In a lathe-chuck, the combination of a body portion forming a seat upon which the part to be operated upon may be clamped, a yielding centering device, a vibrating clamping-ring, surrounding and having pivotal connection with the body portion, with swinging links pivoted to the vibrating ring, and one or more of said links provided with an adjusting or clamping screw, substantially as shown and described.

3. In a lathe-chuck, the combination of a body portion, adapted to form a seat for the part to be operated upon, a means for centering said part, with a vibrating ring pivoted to and surrounding the body portion, and swinging clamping-links pivoted to the vibrating ring, substantially as described.

4. In a work-holding device, a body portion upon which a seat is formed to receive the part to be operated upon, a centering device adapted to yield and allow said part to be pressed against the seat, and a clamping device adapted to vibrate across the center of said seat, substantially as described.

5. In a work-holding device, the combination of a body portion upon which a seat is formed to receive the part to be operated upon, a centering device adapted to yield and allow the said part to be pressed against the seat, and a ring vibrating across the center of said seat and adapted to clamp the part to be operated upon against the seat, substantially as described.

6. In a work-holding device, the combination of a body portion, adapted to form a seat for the part to be operated upon, a yielding centering ring or shell, adapted to slide upon the said body portion, and means for clamping the part to be operated upon to the said seat.

7. A work-holder, consisting of a seat arranged in a plane perpendicular to the axis of the holder, a tapering centering device yieldingly connected with said seat, and equalizing clamping mechanism for securing the work to said seat against the opposing pressure of the centering device, substantially as set forth.

JAMES A. GRAHAM.

Witnesses:
LOUIS O. ZEDLER,
B. C. WAIT.